(12) United States Patent
Subramanian et al.

(10) Patent No.: US 12,216,548 B2
(45) Date of Patent: Feb. 4, 2025

(54) STORAGE RESOURCE RESYNCHRONIZATION USING PENDING IO REQUESTS

(71) Applicant: Dell Products L.P., Round Rock, TX (US)

(72) Inventors: Vasudevan Subramanian, Chapel Hill, NC (US); Nagapraveen Veeravenkata Seela, Cary, NC (US); Michael C. Brundage, Cary, NC (US); Alan L. Taylor, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 180 days.

(21) Appl. No.: 18/164,382

(22) Filed: Feb. 3, 2023

(65) Prior Publication Data

US 2024/0264908 A1    Aug. 8, 2024

(51) Int. Cl.
  *G06F 11/14*    (2006.01)
  *G06F 11/20*    (2006.01)

(52) U.S. Cl.
  CPC ...... *G06F 11/1456* (2013.01); *G06F 11/2082* (2013.01); *G06F 2201/84* (2013.01)

(58) Field of Classification Search
  CPC ............. G06F 11/1446; G06F 11/1456; G06F 11/1471; G06F 11/1658; G06F 11/1662; G06F 11/2056; G06F 11/2064; G06F 11/2082; G06F 2201/84
  See application file for complete search history.

(56) References Cited

U.S. PATENT DOCUMENTS

| | | | | |
|---|---|---|---|---|
| 6,463,573 B1 * | 10/2002 | Maddalozzo, Jr. | ............ | G06F 11/2082 |
| | | | | 716/125 |
| 7,155,635 B1 * | 12/2006 | Phelps | ................ | G06F 11/2082 |
| | | | | 714/34 |
| 7,437,601 B1 * | 10/2008 | Manley | ............... | G06F 11/1464 |
| | | | | 714/6.23 |

(Continued)

OTHER PUBLICATIONS

U.S. Appl. No. 18/740,005, filed Jun. 11, 2024, entitled Techniques for Optimized Data Resynchronization Between Replication Sites, to Vasudevan Subramanian, et al.

*Primary Examiner* — Gabriel Chu
(74) *Attorney, Agent, or Firm* — Krishnendu Gupta; Deepika Bhayana; Derek Lam

(57) ABSTRACT

Techniques are disclosed for storage resource resynchronization using pending IO requests. For example, a method includes, upon detecting a failed network: quiescing IO activity in progress; identifying storage resources and associated pending IO requests; for each storage resource: creating a first snapshot of the storage resource; for each pending IO request, marking blocks specified by the pending IO request as modified; unquiescing the quiesced IO activity; upon detecting the network has been restored: creating a second snapshot of each storage resource; remote mirroring, to the destination, a copy of differences of each source storage resource to the destination storage resource, wherein the differences are identified by comparing the first and the second snapshot; transmitting a request for the destination to create a third snapshot comprising a snapshot of each destination storage resource; and triggering the destination to process the third snapshot to identify storage resources based on the differences.

20 Claims, 4 Drawing Sheets

(56) References Cited

U.S. PATENT DOCUMENTS

| | | | |
|---|---|---|---|
| 7,680,839 B1 * | 3/2010 | Krishnamurthy | G06F 11/2082 707/610 |
| 7,694,177 B2 * | 4/2010 | Zohar | G06F 3/0607 714/6.12 |
| 7,886,119 B1 * | 2/2011 | Cameron | G06F 3/0689 711/114 |
| 2001/0010070 A1 * | 7/2001 | Crockett | G06F 11/2082 714/E11.102 |
| 2002/0194529 A1 * | 12/2002 | Doucette | G06F 11/2064 714/E11.102 |
| 2003/0084242 A1 * | 5/2003 | Strange | G06F 11/2082 711/114 |
| 2024/0311033 A1 | 9/2024 | Subramanian et al. | |

* cited by examiner

STORAGE RESOURCE RESYNCHRONIZATION USING PENDING IO REQUESTS

FIELD

Example embodiments generally relate to data storage systems, e.g., replication in data storage clusters. More specifically, at least some embodiments relate to systems, hardware, software, processor-readable media, and methods for storage resource resynchronization using pending IO requests.

BACKGROUND

Data storage systems typically employ data replication technologies to protect data stored on the data storage systems. Such data replication technologies include synchronous data replication, in which data replication requests are handled in-band with other input/output (IO) requests (e.g., write requests, read requests) being processed at a site of a source storage system (also referred to herein as the "source storage site"). In synchronous data replication, the source storage system typically sends replicas (or copies) of data of storage resources (e.g., logical unit numbers (LUNs), virtual volumes (vVols), file systems) specified in data replication requests to a site of a destination storage system (also referred to herein as the "destination storage site"). As employed herein, the term "snapshot" generally refers to a point-in-time (PIT) replication of data of a storage resource (e.g., a LUN, a vVol, a file system), along with its associated snapshot metadata. Such a snapshot can be a full replica (or copy) of the data stored on the storage resource, a partial copy of the data stored on the storage resource, or a space-efficient copy that includes differences between a current version of the data stored on the storage resource at one PIT and an earlier version of the data stored on the storage resource at a prior PIT.

SUMMARY

In one embodiment, a system comprises at least one processing device including a processor coupled to a memory. The at least one processing device is configured to implement the following steps: in response to detecting, at a source storage system including a source storage array, a failed network connection between the source storage system and a destination storage system including a destination storage array: quiescing, at the source storage system, input/output (IO) activity in progress; identifying, at the source storage system, impacted storage resources and pending IO requests associated with each impacted storage resource; for each impacted storage resource: creating, at the source storage system, a first snapshot comprising a snapshot of the impacted storage resource resident on the source storage array; for each pending IO request associated with the impacted storage resource, marking blocks specified by the pending IO request as modified; unquiescing, at the source storage system, the quiesced IO activity; in response to detecting, at the source storage system, that the network connection has been restored between the source storage system and the destination storage system: creating, at the source storage system, a second snapshot comprising a snapshot of each impacted storage resource resident on the source storage array; performing remote mirroring, from the source storage system to the destination storage system, to store a copy of differences in data of each impacted storage resource resident on the source storage array to the impacted storage resource resident on the destination storage array, wherein the differences in data are identified based on comparing the first and the second snapshot for each impacted storage resource; transmitting, from the source storage system, a snapshot request for the destination storage system to create a third snapshot comprising a snapshot of each impacted storage resource resident on the destination storage array; and triggering, from the source storage system, the destination storage system to process the third snapshot to identify impacted storage resources for review from the destination storage array based on the differences in data from the source storage system.

In some embodiments, marking blocks as modified further includes issuing a data-less write request, at the source storage system, for a logical block address and a length specified by the pending IO request, wherein the data-less write request is configured to mark the blocks as modified in a mapper layer without writing any content to the impacted storage resource resident on the source storage array. The at least one processing device can be further configured to delete, at the source storage system, the first and second snapshot upon receiving, from the destination storage system, an acknowledgment that a resynchronization of the pending IO requests is complete. Quiescing IO activity can further include temporarily pausing incoming requests for storage resources that have metro replication or sync replication enabled to the destination storage system, and unquiescing the quiesced IO activity can further include resuming processing of the incoming requests. Quiescing IO activity can further include freezing an acknowledgement from the source storage system to hosts specified by pending IO requests that have incomplete remote requests for storage resources with metro replication or sync replication enabled to the destination storage system, and unquiescing the quiesced IO activity can further include sending the acknowledgment from the source storage system to the specified hosts. The impacted storage resource can be a volume, a file system, a logical unit (LUN), or a virtual volume (vVol). The impacted storage resource can have metro replication or sync replication enabled. If the impacted storage resource has metro replication enabled, then the source storage array can be designated as Preferred and the destination storage array can be designated as Non-preferred. If the impacted storage resource has sync replication enabled, then the source storage array can be designated as Active.

Other example embodiments include, without limitation, apparatus, systems, methods, and computer program products comprising processor-readable storage media.

Other aspects of the invention will be apparent from the following description and the amended claims.

BRIEF DESCRIPTION OF THE DRAWINGS

The foregoing summary, as well as the following detailed description of exemplary embodiments, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

To easily identify the discussion of any particular element or act, the most significant digit or digits in a reference number refer to the figure number in which that element is first introduced.

In the drawings:

FIG. 1 illustrates aspects of a replication system in accordance with example embodiments;

FIG. 2 illustrates aspects of a mapper layer in accordance with example embodiments;

FIG. 3 illustrates aspects of a method in accordance with example embodiments; and FIG. 4 illustrates aspects of a computing device or computing system in accordance with example embodiments.

DETAILED DESCRIPTION

Figure 1:
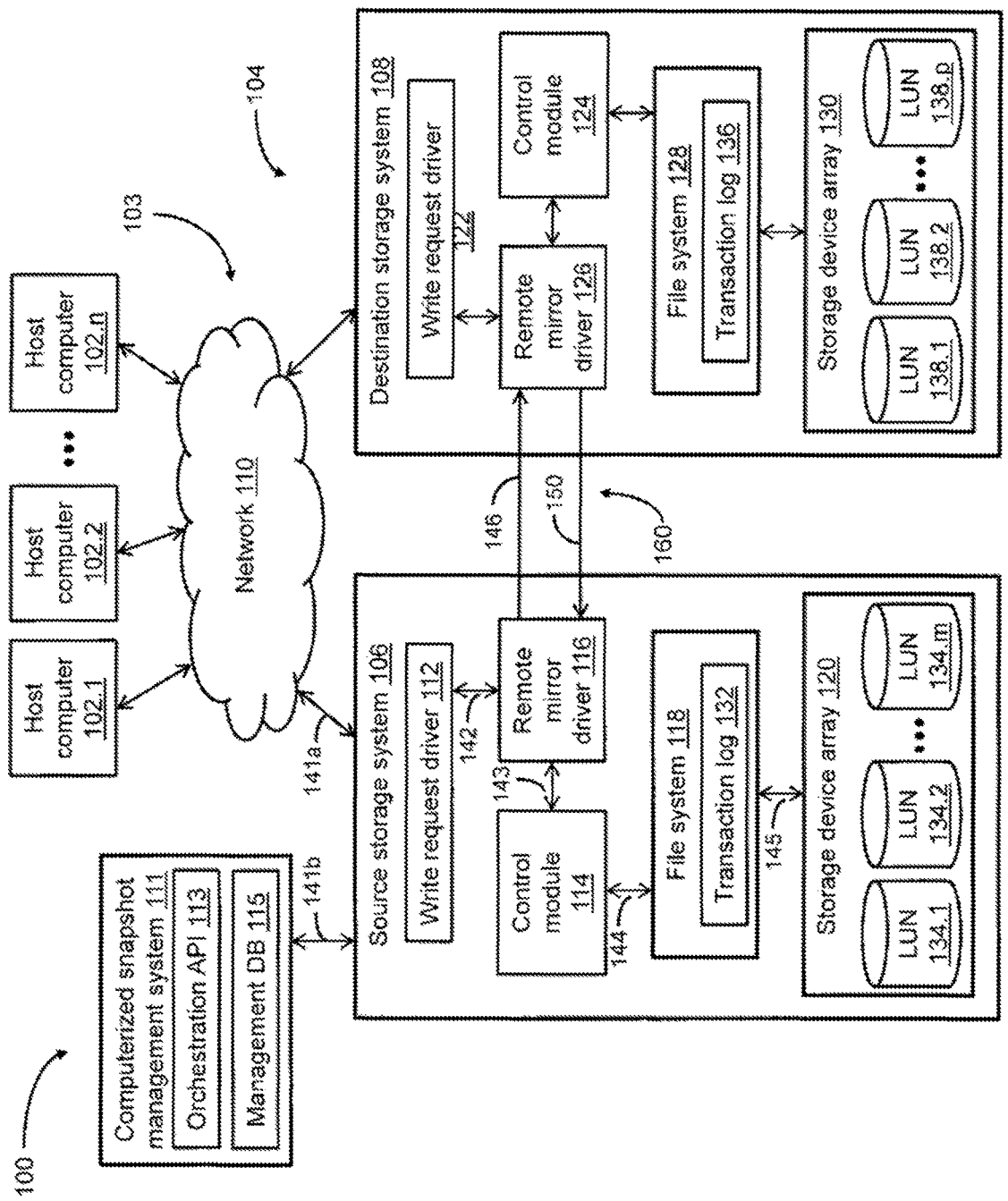

Example embodiments generally relate to data storage systems, e.g., replication in data storage clusters. More specifically, at least some embodiments relate to systems, hardware, software, processor-readable media, and methods for storage resource resynchronization using pending IO requests.

Disclosed herein are techniques for storage resource resynchronization in a data storage cluster using pending IO requests. The present techniques leverage pending IO requests to identify potential differences in data between a source and a destination storage system. Pending IO requests can be, for example, in-progress remote requests that track writes that may have been in progress on the source storage system at the time of network failure. The potential differences can be identified by, for example, marking blocks specified by the pending IO request as modified. In some embodiments, a data-less write request can be used for a logical block address and a length specified by the pending IO request. For example, the data-less write request can be configured to mark the specified blocks as modified in a mapper layer, without writing any content to the impacted storage resource resident on a source storage array. Upon detecting a restored network connection, the source storage system can remote mirror the potential differences to the destination storage system for applying to the storage resource resident on a destination storage array.

In a metro replication or sync replication for a data storage cluster, there are usually two data centers or sites (sometimes referred to herein as the source storage system and the destination storage system) and the computing, networking, and storage resources on the two sites provides the needed redundancy for the user's application. Usually, the resources (e.g., servers, storage, network switches) at both the data centers are within the control of the site administrator(s) and are made redundant to avoid a single point of failure. Storage appliances for example provide inherent redundancy with dual controllers and dual power-supplies. Example storage appliances include the PowerStore family of storage products offered by Dell Technologies. The other critical resource for a complete metro or sync replication solution is the networking link or connection between the source and destination sites. These can be, for example, private network links or leased network links controlled by a network provider. These network links may not be point-to-point and may involve multiple switches, networks and edge devices that might not provide desired redundancy. Hence, the networking link between the source and destination sites might be the weakest link in the metro replication or sync replication solutions. Even if the network links are redundant, the secondary redundant link might have far higher latency due to routing via alternate backbone links that have longer paths. For example, one study has shown that for 25% of network providers providing such services, the Mean Time Between Failure can be around 1000 hours and for 50% around 2000 hours. This implies that the inter-site network failure (transient or longer) can happen often and technical solutions to reduce the time to recover from such network failures might be helpful.

When users deploy metro replication or sync replication in a data storage cluster, users first expect the solution to provide continuous availability for their application and, second, the redundancy to be quickly restored quickly after a failure in case another independent failure happened. The faster the MTTR (Mean Time to Recovery), the better the customers are served. As noted, any secondary network link used after fault of the primary network link might have longer latency and hence has an impact as well.

Conventional synchronous replication in data storage cluster can include creating recovery snapshots periodically, e.g., every 30 minutes. The recovery snapshots are leveraged to determine the write requests that might not have been replicated at the time of any fault in the source and destination sites, or in the network link between the source and destination sites.

The present techniques enhance resynchronization in response to the loss of the network link between sites. More particularly, the present mechanism reduces the amount of network transfer that needs to be made once the network link between sites is interrupted, instead of relying on conventional recovery snapshots that could have been created as long as 30 minutes prior to the network failure.

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 depicts an illustrative embodiment of a data storage environment 100, in which an exemplary data storage system 104 configured for storage resource resynchronization using pending IO requests can be employed. As shown in FIG. 1, the data storage system 104 includes a source storage system 106 and a destination storage system 108. The data storage environment 100 includes a plurality of host computers 102.1, 102.2, . . . , 102.n communicably coupled to the data storage system 104 by a communications medium 103 that includes a network 110. For example, each of the plurality of host computers 102.1, 102.2, . . . , 102.n may be configured as a web server computer, a file server computer, an email server computer, an enterprise server computer, a database server, and/or any other suitable computer or computerized device, for providing input/output (IO) requests (e.g., small computer system interface (SCSI) commands, NFS or CIFS commands) to the data storage system 104 over the communications medium 103. Such IO requests (e.g., write requests, read requests) provided by the plurality of host computers 102.1, 102.2, . . . , 102.n can direct the data storage system 104 to store and/or retrieve blocks of data to/from storage resources (e.g., logical unit numbers (LUNs), virtual volumes (vVols), file systems) on behalf of the respective host computers 102.1, 102.2, . . . , 102.n.

The communications medium 103 can be configured to interconnect the plurality of host computers 102.1, 102.2, . . . , 102.n with the data storage system 104 (including the source storage system 106 and the destination storage system 108) to enable them to communicate and exchange electronic signals. As shown in FIG. 1, at least a portion of the communications medium 103 is illustrated as a "cloud" to indicate that the communications medium 103 can have a variety of different topologies including, but not limited to, backbone, hub-and-spoke, loop, irregular, or any suitable combination thereof. The communications medium 103 can also include, but is not limited to, copper-based data communications devices and cabling, fiber optic devices and cabling, wireless devices, or any suitable combination thereof. In addition, the communications medium 103 can be configured to support storage area network (SAN)-based communications, local area network (LAN)-based communications, cellular communications, wide area network (WAN)-based communications, distributed infrastructure communications, and/or any other suitable communications.

As shown in FIG. 1, the source storage system 106 can include a plurality of layered drivers such as a write request driver 112 and a remote mirror driver 116, a control module 114 for controlling the layered drivers 112, 116, a file system 118, and a storage device array 120. The destination storage system 108 can likewise include a plurality of layered drivers such as a write request driver 122 and a remote mirror driver 126, a control module 124 for controlling the layered drivers 122, 126, a file system 128, and a storage device array 130. Each of the write request drivers 112, 122, the control modules 114, 124, the remote mirror drivers 116, 126, and the file systems 118, 128 can be implemented within the data storage system 104 using any suitable computer or processing hardware, software, and/or combination thereof. The source storage system 106 and the destination storage system 108 can be configured to process IO requests from one or more of the host computers 102.1, 102.2, . . . , 102.$n$, and store host data in a redundant array of independent disk (RAID) environment implemented by the storage device array 120 and the storage device array 130, respectively. In certain embodiments, the source storage system 106 and/or the destination storage system 108 can be configured to store the host data in a cloud-based storage environment or any other suitable data storage environment.

As further shown in FIG. 1, the file system 118 and the file system 128 can include a transaction log 132 and a transaction log 136, respectively, each of which can be implemented as a persistent cache. It is noted that each of the source storage system 106 and the destination storage system 108 can further include persistent memory storage (e.g., flash memory, magnetic memory) and/or non-persistent memory storage (e.g., dynamic random access memory (DRAM), static random access memory (SRAM)), and accommodate a variety of software constructs including, but not limited to, operating system code and data, data storage system code and data, synchronous data replication code and data, and synchronous snapshot replication code and data. The storage device array 120 of the source storage system 106 can store a plurality of storage volumes 134.1, 134.2, . . . , 134.$m$, each of which can be implemented as a LUN, a vVol, or any other suitable storage volume or resource. The storage device array 130 of the destination storage system 108 can likewise store a plurality of storage volumes 138.1, 138.2, . . . , 138.$p$, each of which can be implemented as a LUN, a vVol, or any other suitable storage volume or resource.

In certain embodiments, the data storage system 104 including the source storage system 106 and the destination storage system 108 can be configured to perform synchronous data replication by executing synchronous mirroring operations. To avoid data loss or unavailability due to an accident or disaster, or maintenance, repair, or failure of one or more storage volumes or resources within the data storage system 104, replicas (or copies) of the data stored on the storage device array 120 of the source storage system 106 can be stored on the storage device array 130 of the destination storage system 108, which can be physically separated from the source storage system 106. For example, the source storage system 106 may be configured to communicate with the destination storage system 108 over a communications link 160 such as a SCSI link, a Fibre Channel link, or any other suitable communications link. In certain embodiments, the destination storage system 108 can be configured as local, logically independent storage (e.g., an isolated storage pool) on the source storage system 106. As employed herein, the term "remote mirroring" (or simply "mirroring") refers to storing copies of host data from the source storage system 106 to the destination storage system 108. Such remote mirroring can permit the source storage system 106 to retrieve host data from the destination storage system 108 in the event the host data on the source storage system 106 is lost or unavailable.

To avoid such data loss or unavailability, the data storage system 104 can be configured to perform remote mirroring to manage multiple images, each consisting of one or more LUNs, vVols, file systems, or any other suitable storage resources. The data storage system 104 can maintain multiple mirrors simultaneously, in which each mirror corresponds to a different set of images. For example, with regard to a particular mirror, the data storage system 104 may designate one image on the source storage system 106 as a primary image, and designate another image on the destination storage system 108 as a secondary image. It is noted, however, that, within a data storage system maintaining multiple mirrors, a respective storage system may store a primary image for a first mirror, and a secondary image for a second mirror that is different from the first mirror.

To assure data availability such that host data can be readily retrieved from the destination storage system 108 in the event the host data on the source storage system 106 is lost or unavailable, the secondary image of the host data on the destination storage system 108 must be synchronized with the primary image of the host data on the source storage system 106. In this way, it can be assured that the secondary image of the host data on the destination storage system 108 contains the same information as the primary image of the host data on the source storage system 106. In certain embodiments, the source storage system 106 can be configured to coordinate the synchronization of the primary and secondary images of the host data. For example, one of the host computers 102.1, 102.2, . . . , 102.$n$ may issue a write request over a path 141$a$ to the source storage system 106. Upon receipt of the write request, the source storage system 106 may process the write request in an IO path 142, 143, 144, 145 to the storage device array 120, storing the host data on the storage device array 120 as a primary image of the host data. Concurrent with the processing of the write request in the IO path 142-145, the write request driver 112 may issue, in coordination with the remote mirror driver 116, a further write request over a path 146 of the communications link 160 to the remote mirror driver 126 of the destination storage system 108. Upon receipt of the write request at the remote mirror driver 126, the destination storage system 108 may store a copy of the host data on the storage device array 130 as a secondary image of the host data. Once the secondary image of the host data has been stored on the storage device array 130, the destination storage system 108 may issue an acknowledgement over a path 150 of the communications link 160 to the source storage system 106. Once the processing of the respective write requests to the source storage system 106 and the destination storage system 108 is completed, the source storage system 106 may issue a further acknowledgement over the path 141a to the host computer 102.1, 102.2, . . . , or 102.n that issued the original write request. In certain embodiments, the source storage system 106 can issue the acknowledgement over the path 141a to the respective host computer 102.1, 102.2, . . . , or 102.n once the host data is accounted for in the transaction log 132 of the file system 118, in the event the destination storage system 108 is temporarily unavailable. Such remote mirroring of host data is further described in U.S. Pat. No. 6,823,349 issued Nov. 23, 2004 entitled METHOD AND SYSTEM FOR ESTABLISHING, MAINTAINING, AND USING A PERSISTENT FRACTURE LOG, the disclosure of which is hereby incorporated herein by reference in its entirety.

In example embodiments, snapshot requests can be provided by a computerized snapshot management system 111. As shown in FIG. 1, the computerized snapshot management system 111 can include an orchestration application programming interface (also referred to herein as the "orchestration API") 113 and a management database (DB) 115. The orchestration API 113 can be configured to determine at least an overall network configuration of the data storage system 104, as well as the locations of storage resources (e.g., the LUNs 134.1, 134.2, . . . , 134.m, the LUNs 138.1, 138.2, . . . , 138.p) with respect to one or more storage device arrays (e.g., the storage device array 120, the storage device array 130). The management DB 115 can be configured to store at least information pertaining to the network configuration of the data storage system 104, and the locations of the various storage resources within the data storage system 104.

While performing synchronous snapshot replication, the data storage system 104 can process each snapshot request provided by the computerized snapshot management system 111 as a type of IO request, providing synchronization between respective snapshot requests and other IO requests (e.g., write requests, read requests) received at the source storage system 106. As a result, the data storage system 104 can leverage pending IO requests (e.g., in-progress write requests) that are in the middle of processing once a network connection failure is detected. Advantageously, example embodiments of the data storage system 104 are configured to create snapshots on demand, rather than rely on recovery snapshots that may have been stale for up to 30 minutes prior to network failure.

In the context of data storage systems (e.g., data storage system 104), metadata may generally include useful internal information managed by a storage array to describe and locate user data. Modern storage arrays abstract the physical media and present logical (virtualized) addresses to clients in the form of LUNs. The mapping between the logical address and physical address is a form of metadata that the storage array manages. That is typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of conventional storage systems directly links a Logical Address of a Block to the Physical Location of the Block. In this metadata structure, every logical block written, has a physical block linked directly to it. In addition, since most conventional storage systems were architected for a spinning disk storage medium optimized for sequential writes, the address of the logical address affects the physical location that the data is stored. This can lead to an unbalanced storage array that can suffer from hot-spots as specific address space ranges may experience more performance/input-output operations per second (IOPs) than other address space ranges.

Example embodiments may support a flash or random access medium. For example, some embodiments may include a metadata structure that decouples the Logical Block Address space address from the physical one. This is done by leveraging a multi-layer architecture.

Figure 2:
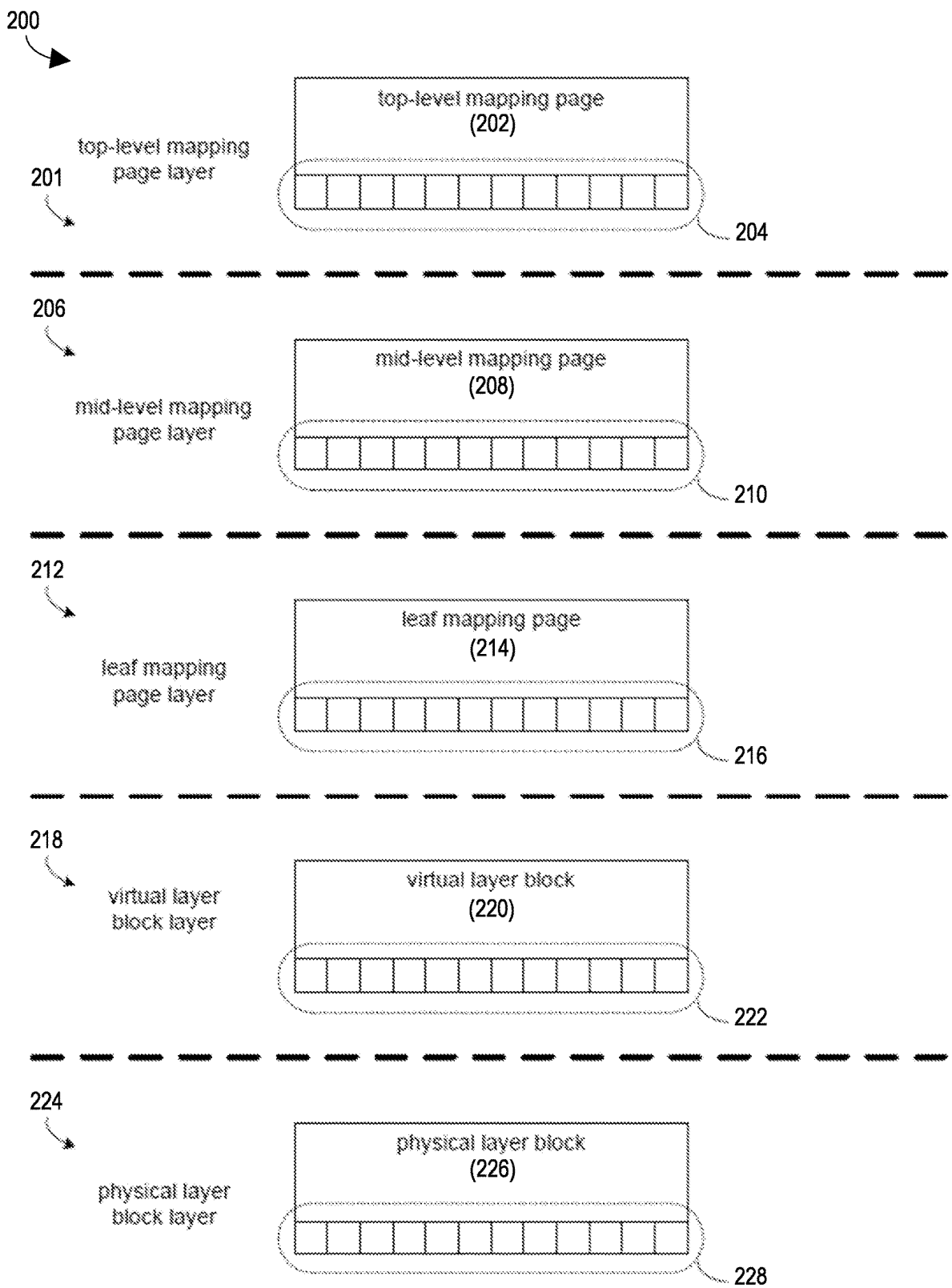

FIG. 2 depicts an illustrative embodiment of a mapper layer. As shown in FIG. 2, a storage system may generally include a mapper layer (e.g., mapper layer 200) that is structured as a file system with various layers of pages and blocks. In some implementations, the combination of various mapper layers may be referred to as a mapper metadata tree. While the following example includes metadata "blocks", it will be appreciated that other units of data storage may be used within the scope of the present disclosure. In some implementations, a top-level mapping page layer (e.g., top-level mapping page layer 202) may include top-level mapping page pages (e.g., top-level mapping page 201) with a plurality of entries (e.g., plurality of entries 204) that map or point to a plurality of entries of one or more mid-level mapping pages. A mid-level mapping page layer (e.g., mid-level mapping page layer 206) may include mid-level mapping page pages (e.g., mid-level mapping page 208) with a plurality of entries (e.g., plurality of entries 210) that map or point to a plurality of entries of one or more leaf mapping pages. A leaf mapping page layer (e.g., leaf mapping page layer 212) may include leaf mapping page pages (e.g., leaf mapping page 214) with a plurality of entries (e.g., plurality of entries 216) that map or point to a plurality of entries of one or more virtual layer blocks. Leaf mapping page layer 212 may represent various ranges of Logical Block Addresses (LBAs). For example, each entry of the plurality of entries (e.g., plurality of entries 216) of the leaf mapping page (e.g., leaf mapping page 214) may be associated with a LBA range. In some implementations, the combination of top-level mapping page layer 202, mid-level mapping page layer 206, and leaf mapping page layer 212 may be organized in a "tree" data structure where each leaf mapping page is a "leaf" of the "tree" data structure that corresponds to a specific LBA range. Accordingly, each leaf mapping page (e.g., leaf mapping page 214) may hold mapping of a LBA to a virtual layer block. It will be appreciated that other data structures may be used within the scope of the present disclosure to organize the first layer.

In some implementations, a virtual layer block layer (e.g., second layer 218) may include virtual layer blocks (e.g., virtual layer block 220) with a plurality of entries (e.g., plurality of entries 222) that map to a plurality of entries of one or more physical data blocks. The virtual layer block layer (e.g., virtual layer block layer 218) may generally isolate the logical address of a block from the physical location of the block. For example, a virtual layer block (e.g., virtual layer block 220) may encapsulate the physical location of user data and allow relocation without updating leaf mapping pages (e.g., leaf mapping page 214). Accordingly, the virtual layer block layer (e.g., virtual layer block layer 218) may decouple the Logical Block Address space address from the physical one.

In some implementations, a physical data block layer (e.g., physical data block layer 224) may include physical data blocks (e.g., physical data block 226) with a plurality of entries or portions (e.g., plurality of entries 228) that are configured to store user data. In this manner, physical data block layer 224 may describe the physical location of user data in a storage system. In some implementations, each physical data block (e.g., physical data block 226) may have a predefined amount of storage capacity for storing data (e.g., user data).

Figure 3:
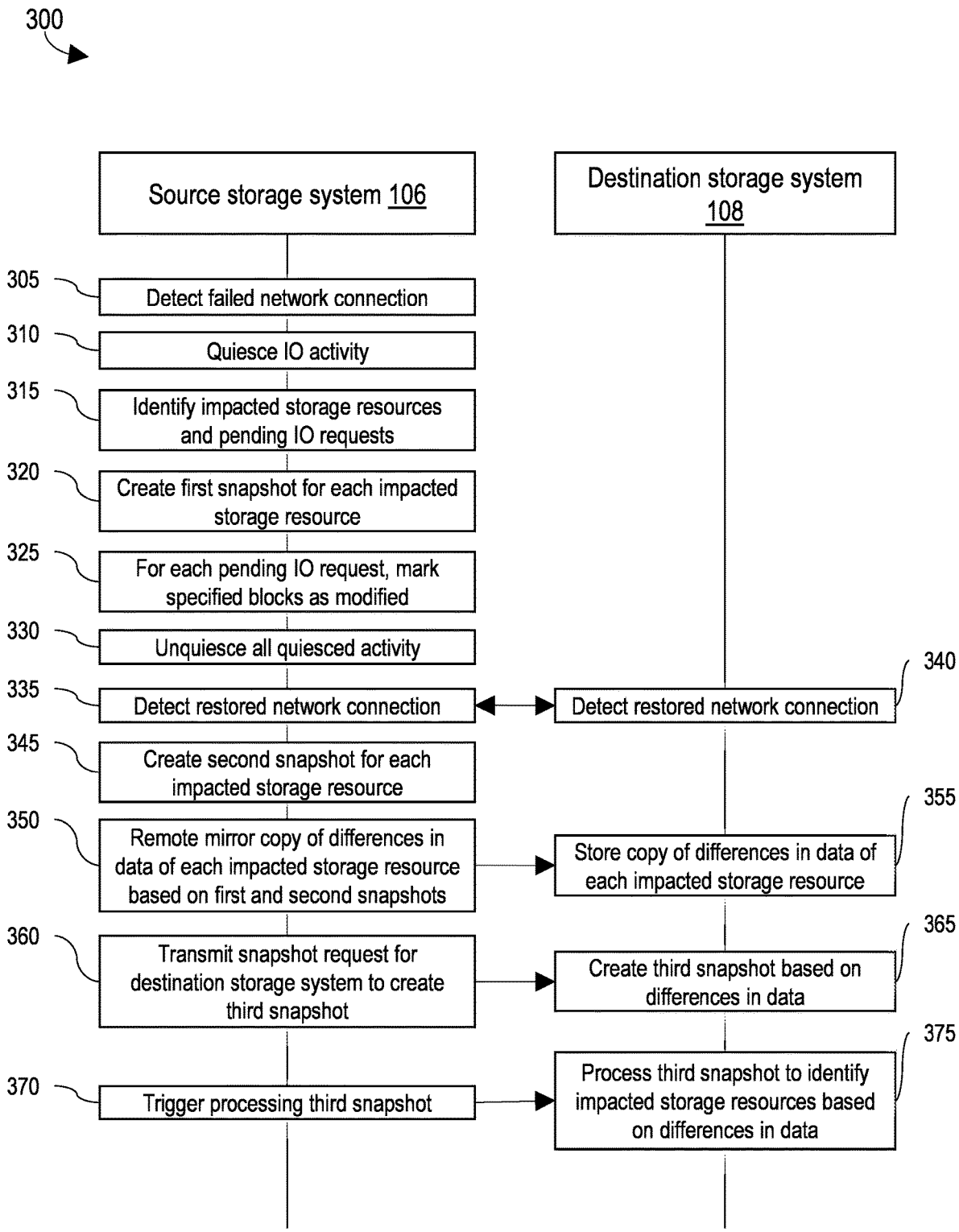

FIG. 3 depicts an illustrative embodiment of a method 300.

As shown in FIG. 3, the method 300 may be performed between a source storage system 106 and a destination storage system 108. The source storage system 106 can include a source storage array 120. The source storage system 106 can be communicatively coupled via a network connection to a destination storage system 108 including a destination storage array 130. In some embodiments, storage resources resident on the source storage array 120 can have metro replication or sync replication enabled to the destination storage system. Accordingly, for a given storage resource, the source storage system 106 is presumed to be designated as Preferred if metro replication is enabled or as Active if sync replication is enabled, for ease of discussion herein.

In the illustrated example, in both metro and sync replication scenarios IO requests (e.g., write requests) from hosts (e.g., hosts 102.1, 102.2, . . . , 102.n) are committed to the source storage system 106 first. Upon a network fault, the IO requests need to be resynchronized with the corresponding destination storage resource on the destination storage system 108, so that the storage resources on the source storage system 106 and the destination storage system 108 are in sync, thereby providing full Disaster Recovery capability to the customer for the next fault.

In the illustrated example, immediately prior to a network failure, the source storage resource on the source storage system 106 and the destination storage resource on the destination storage system 108 were almost in sync. In the event of a network failure, the only write requests that might have been missing (e.g., unfulfilled) on the destination storage system 108 might be all the pending IO requests (e.g., in-progress write requests) for the given storage resource. Some of the pending IO requests might have been received on the destination storage system 108 and might have been processed on the destination storage system 108, however the acknowledgement of these IO requests may not have been received on the source storage system 106 when the network link failed (e.g., disconnected). Other such write requests might be lost in transit between the source and destination storage systems or might be queued in some layer on the source storage system 106 or the destination storage system 108. The present techniques provide a mechanism to process these pending IO requests (e.g., in-progress write requests), thereby allowing resynchronization of storage resources between the source storage system 106 and the destination storage system 108 to complete more dynamically, responsively, and quickly, compared with conventional recovery using periodic snapshots that fail to leverage pending IO requests.

In example embodiments, the method 300 includes detecting a failed network connection (step 305). More precisely, the illustrated example presumes the following timeline:
  Time T0: There are 100 in-progress write requests for storage resource vol1 that is being protected with either metro replication or sync replication.
  Time T0+few milliseconds: the network link between the source storage system 106 and the destination storage system 108 goes down.

At this time, storage resource vol1 on the source storage system 106 has 100 write requests that may or may not, have been received on the destination storage system 108. Hence, the assumption in view of the information available is that the destination storage system 108 does not have these 100 write requests. In example embodiments, each of these 100 IO requests to the destination storage system 108 is being tracked with an associated IO request (e.g., an iorequest object), as discussed in further detail herein. The IO request is configured to track what needs to be synchronized in the present techniques.

In example embodiments, the method 300 includes, in response to detecting the failed network connection, quiescing IO activity (step 310). In some embodiments, quiescing IO activity can include temporarily pausing incoming requests for storage resources that have metro replication or sync replication enabled to the destination storage system 108. In some embodiments, quiescing IO activity can further include freezing an acknowledgement from the source storage system 106 to hosts 102.1, 102.2, . . . , 102.n specified by pending IO requests that have incomplete remote requests for storage resources with metro replication or sync replication enabled to the destination storage system 108.

In example embodiments, the method 300 includes identifying, at the source storage system, impacted storage resources and pending IO requests associated with each impacted storage resource (step 315). In some embodiments, the impacted storage resources can be a volume, a file system, a logical unit (LUN), or a virtual volume (vVol). In example embodiments, the pending IO requests can include in-progress write requests, e.g., write requests that were in the middle of being processed by the source storage system 106 and/or the destination storage system 108 when the network connection failure was detected.

In example embodiments, the method 300 includes creating, at the source storage system, a first snapshot (step 320). The first snapshot can be a snapshot of the impacted storage resource resident on the source storage array 120.

In example embodiments, the method 300 includes, for each pending IO request associated with the impacted storage resource, marking blocks specified by the pending IO request as modified (step 325). In some embodiments, marking blocks as modified can include issuing a data-less write request, at the source storage system, for a logical block address and a length specified by the pending IO request. In an example implementation, the data-less write request can be configured to mark the specified blocks as modified in a mapper layer 200, without writing any content to the impacted storage resource resident on the source storage array 120.

In example embodiments, the method 300 includes unquiescing, at the source storage system, the quiesced IO activity (step 330). For example, unquiescing the quiesced activity can include resuming processing of the incoming requests that were previously temporarily paused. In some embodiments, unquiescing the quiesced activity includes sending any previously frozen acknowledgments from the source storage system to the specified hosts.

In example embodiments, the method 300 includes detecting a restored network connection (steps 335, 340). The restored network connection can be detected at the source storage system 106 (step 335). Alternatively, the restored network connection can be detected at the destination storage system 108 (step 340), and the destination storage system 108 can send an acknowledgment or other IO request to the source storage system 106.

In example embodiments, the method 300 includes, upon detecting the restored network connection, creating a second snapshot for each impacted storage resource resident on the source storage array 120 (step 345). It is appreciated that the network interruption may have been transient, or lasted for a few minutes or even many hours or days. Accordingly, the difference between the first and second snapshots generally represents differences in content and metadata that need to be copied (e.g., remote mirrored) for the duration of the network interruption between the source storage system 106 and the destination storage system 108.

In example embodiments, the method 300 includes performing remote mirroring, from the source storage system 106 to the destination storage system 108 (step 350). The remote mirroring stores a copy of differences in data (step 355) of each impacted storage resource resident on the source storage array 120 to the impacted storage resource resident on the destination storage array 130. In some embodiments, the differences in data can be identified based on comparing the first and the second snapshot for each impacted storage resource.

In example embodiments, the method 300 includes transmitting, from the source storage system 106 to the destination storage system 108, a snapshot request (step 360). Upon receiving the snapshot request, the destination storage system 108 creates a third snapshot (step 365). In some embodiments, the third snapshot can be a snapshot of each impacted storage resource resident on the destination storage array 130. This third snapshot generally represents the last point-in-time the impacted storage resource was in sync with the source storage resource. It is further appreciated that additional snapshots can be created while the source storage system 106 and the destination storage system 108 remain out of sync.

In example embodiments, the method 300 includes triggering, from the source storage system 106, the destination storage system 108 to process the third snapshot (step 370). In some embodiments, the destination storage system 108 is configured to process the third snapshot to identify impacted storage resources for review from the destination storage array 130 based on the differences in data from the source storage system 106 (step 375). For example, the destination storage system 108 can compare the differences in data identified from the source storage system 106 to the contents of the third snapshot, thereby identifying the contents and metadata to allow resynchronizing the destination storage system 108. If additional snapshots were previously created, those additional snapshots can be processed by the destination storage system 108 based on the differences in data from the source storage system 106.

In example embodiments, the method 300 includes receiving, from the destination storage system, an acknowledgment that a resynchronization of the pending IO requests is complete and deleting, at the source storage system, the first and second snapshot upon receiving the acknowledgment.

While the various steps in the example method 300 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example method 300 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

As mentioned, at least portions of the data storage system 104 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 104. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 4. Although described in the context of system 104, these platforms may also be used to implement at least portions of other information processing systems in other embodiments.

Figure 4:
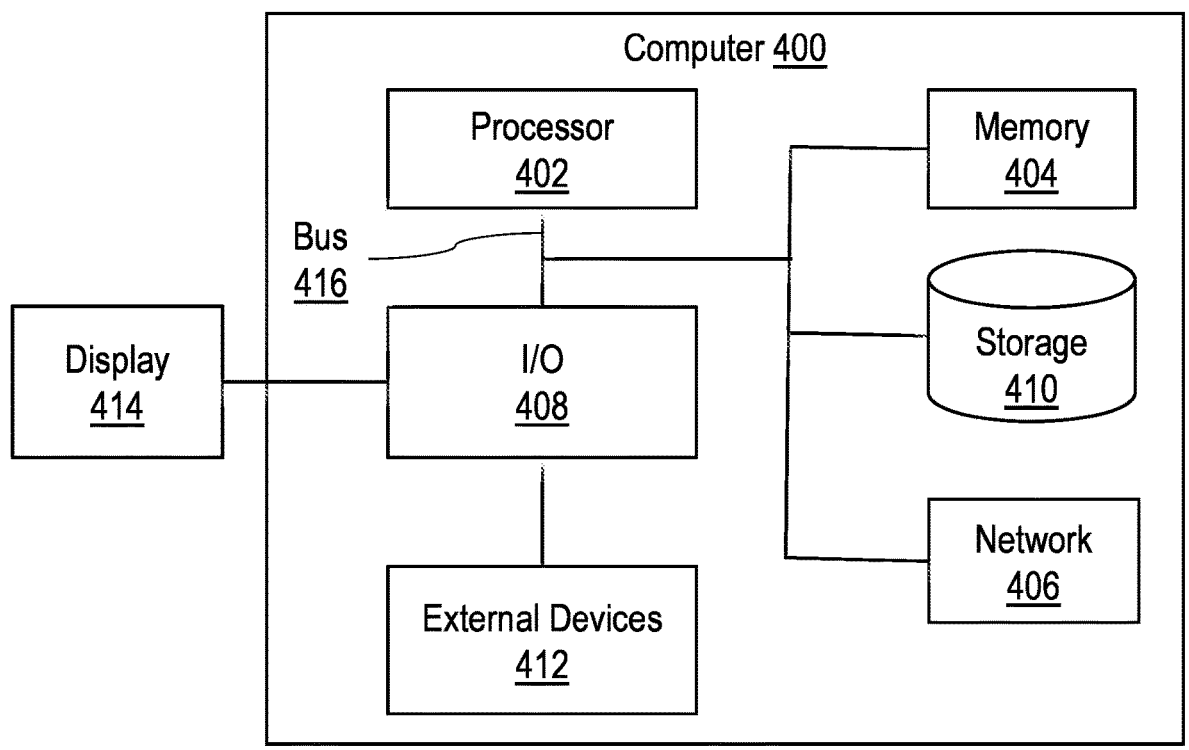

FIG. 4 illustrates aspects of a computing device or a computing system in accordance with example embodiments. The computer 400 is shown in the form of a general-purpose computing device. Components of the computer may include, but are not limited to, one or more processors or processing units 402, a memory 404, a network interface 406, and a bus 416 that communicatively couples various system components including the system memory and the network interface to the processor.

The bus 416 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 400 typically includes a variety of processor-readable media. Such media may be any available media that is accessible by the computer system, and such media includes both volatile and non-volatile media, removable and non-removable media.

The memory 404 may include computer system readable media in the form of volatile memory, such as random-access memory (RAM) and/or cache memory. The computer system may further include other removable/non-removable, volatile/non-volatile computer system storage media. By way of example only, the storage system 410 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 416 by one or more data media interfaces. As has been depicted and described above in connection with FIGS. 1-4, the memory may include at least one computer program product having a set (e.g., at least one) of program modules that are configured to carry out the functions of the embodiments as described herein.

The computer 400 may also include a program/utility, having a set (at least one) of program modules, which may be stored in the memory 404 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 400 may also communicate with one or more external devices 412 such as a keyboard, a pointing device, a display 414, etc.; one or more devices that enable a user to interact with the computer system; and/or any devices (e.g., network card, modem, etc.) that enable the computer system to communicate with one or more other computing devices. Such communication may occur via the IO interfaces 408. Still yet, the computer system may communicate with one or more networks such as a local area network (LAN), a general wide area network (WAN), and/or a public network (e.g., the Internet) via the network adapter 406. As depicted, the network adapter communicates with the other components of the computer system via the bus 416. It should be understood that although not shown, other hardware and/or software components could be used in conjunction with the computer system. Non-limiting examples include microcode, device drivers, redundant processing units, external disk drive arrays, Redundant Array of Independent Disk (RAID) systems, tape drives, data archival storage systems, etc.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

In the foregoing description of FIGS. 1-4, any component described with regard to a figure, in various embodiments of the invention, may be equivalent to one or more like-named components described with regard to any other figure. For brevity, descriptions of these components has not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the disclosure, ordinal numbers (e.g., first, second, third, etc.) may have been used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout this disclosure, elements of figures may be labeled as "a" to "n". As used herein, the aforementioned labeling means that the element may include any number of items and does not require that the element include the same number of elements as any other item labeled as "a" to "n." For example, a data structure may include a first element labeled as "a" and a second element labeled as "n.". This labeling convention means that the data structure may include any number of the elements. A second data structure, also labeled as "a" to "n," may also include any number of elements. The number of elements of the first data structure and the number of elements of the second data structure may be the same or different.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the invention should be limited only by the appended claims.

What is claimed is:

1. A system comprising:
    at least one processing device including a processor coupled to a memory;
    the at least one processing device being configured to implement the following steps:
        in response to detecting, at a source storage system including a source storage array, a failed network connection between the source storage system and a destination storage system including a destination storage array:
            quiescing, at the source storage system, input/output (IO) activity in progress;
            identifying, at the source storage system, impacted storage resources and pending IO requests associated with each impacted storage resource;
            for each impacted storage resource:
                creating, at the source storage system, a first snapshot comprising a snapshot of the impacted storage resource resident on the source storage array;
                for each pending IO request associated with the impacted storage resource, marking blocks specified by the pending IO request as modified;
            unquiescing, at the source storage system, the quiesced IO activity;
        in response to detecting, at the source storage system, that the network connection has been restored between the source storage system and the destination storage system:
            creating, at the source storage system, a second snapshot comprising a snapshot of each impacted storage resource resident on the source storage array;
            performing remote mirroring, from the source storage system to the destination storage system, to store a copy of differences in data of each impacted storage resource resident on the source storage array to the impacted storage resource resident on the destination storage array, wherein the differences in data are identified based on comparing the first and the second snapshot for each impacted storage resource;
            transmitting, from the source storage system, a snapshot request for the destination storage system to create a third snapshot comprising a snapshot of each impacted storage resource resident on the destination storage array; and
            triggering, from the source storage system, the destination storage system to process the third snapshot to identify impacted storage resources for review from the destination storage array based on the differences in data from the source storage system.

2. The system of claim 1, wherein marking blocks as modified further comprises:
    issuing a data-less write request, at the source storage system, for a logical block address and a length specified by the pending IO request, wherein the data-less write request is configured to mark the blocks as modified in a mapper layer without writing any content to the impacted storage resource resident on the source storage array.

3. The system of claim 1, the at least one processing device being further configured to implement the following steps:
    deleting, at the source storage system, the first and second snapshot upon receiving, from the destination storage system, an acknowledgment that a resynchronization of the pending IO requests is complete.

4. The system of claim 1,
    wherein quiescing IO activity further comprises temporarily pausing incoming requests for storage resources that have metro replication or sync replication enabled to the destination storage system, and
    wherein unquiescing the quiesced IO activity further comprises resuming processing of the incoming requests.

5. The system of claim 1, wherein quiescing IO activity further comprises freezing an acknowledgment from the source storage system to hosts specified by pending IO requests that have incomplete remote requests for storage resources with metro replication or sync replication enabled to the destination storage system, and wherein unquiescing the quiesced IO activity further comprises sending the acknowledgment from the source storage system to the specified hosts.

6. The system of claim 1, wherein the impacted storage resource comprises a volume, a file system, a logical unit (LUN), or a virtual volume (vVol).

7. The system of claim 1, wherein the impacted storage resource has metro replication or sync replication enabled.

8. The system of claim 7, wherein, if the impacted storage resource has metro replication enabled, then the source storage array is designated as Preferred and the destination storage array is designated as Non-preferred.

9. The system of claim 7, wherein, if the impacted storage resource has sync replication enabled, then the source storage array is designated as Active.

10. A method comprising:
    in response to detecting, at a source storage system including a source storage array, a failed network connection between the source storage system and a destination storage system including a destination storage array:
        quiescing, at the source storage system, input/output (IO) activity in progress;
        identifying, at the source storage system, impacted storage resources and pending IO requests associated with each impacted storage resource;
        for each impacted storage resource:
            creating, at the source storage system, a first snapshot comprising a snapshot of the impacted storage resource resident on the source storage array;
            for each pending IO request associated with the impacted storage resource, marking blocks specified by the pending IO request as modified;
        unquiescing, at the source storage system, the quiesced IO activity;
    in response to detecting, at the source storage system, that the network connection has been restored between the source storage system and the destination storage system:

creating, at the source storage system, a second snapshot comprising a snapshot of each impacted storage resource resident on the source storage array;

performing remote mirroring, from the source storage system to the destination storage system, to store a copy of differences in data of each impacted storage resource resident on the source storage array to the impacted storage resource resident on the destination storage array, wherein the differences in data are identified based on comparing the first and the second snapshot for each impacted storage resource;

transmitting, from the source storage system, a snapshot request for the destination storage system to create a third snapshot comprising a snapshot of each impacted storage resource resident on the destination storage array; and triggering, from the source storage system, the destination storage system to process the third snapshot to identify impacted storage resources for review from the destination storage array based on the differences in data from the source storage system.

11. The method of claim 10, wherein marking blocks as modified further comprises:

issuing a data-less write request, at the source storage system, for a logical block address and a length specified by the pending IO request, wherein the data-less write request is configured to mark the blocks as modified in a mapper layer without writing any content to the impacted storage resource resident on the source storage array.

12. The method of claim 10, further comprising:

deleting, at the source storage system, the first and second snapshot upon receiving, from the destination storage system, an acknowledgment that a resynchronization of the pending IO requests is complete.

13. The method of claim 10, wherein quiescing IO activity further comprises temporarily pausing incoming requests for storage resources that have metro replication or sync replication enabled to the destination storage system, and wherein unquiescing the quiesced IO activity further comprises resuming processing of the incoming requests.

14. The method of claim 10, wherein quiescing IO activity further comprises freezing an acknowledgment from the source storage system to hosts specified by pending IO requests that have incomplete remote requests for storage resources with metro replication or sync replication enabled to the destination storage system, and wherein unquiescing the quiesced IO activity further comprises sending the acknowledgment from the source storage system to the specified hosts.

15. The method of claim 10, wherein the impacted storage resource comprises a volume, a file system, a logical unit (LUN), or a virtual volume (vVol).

16. The method of claim 10, wherein the impacted storage resource has metro replication or sync replication enabled.

17. The method of claim 16, wherein, if the impacted storage resource has metro replication enabled, then the source storage array is designated as Preferred and the destination storage array is designated as Non-preferred.

18. The method of claim 16, wherein, if the impacted storage resource has sync replication enabled, then the source storage array is designated as Active.

19. A non-transitory processor-readable storage medium having stored thereon program code of one or more software programs, wherein the program code when executed by at least one processing device causes the at least one processing device to perform the following steps:

in response to detecting, at a source storage system including a source storage array, a failed network connection between the source storage system and a destination storage system including a destination storage array:

quiescing, at the source storage system, input/output (IO) activity in progress;

identifying, at the source storage system, impacted storage resources and pending IO requests associated with each impacted storage resource;

for each impacted storage resource:

creating, at the source storage system, a first snapshot comprising a snapshot of the impacted storage resource resident on the source storage array;

for each pending IO request associated with the impacted storage resource, marking blocks specified by the pending IO request as modified;

unquiescing, at the source storage system, the quiesced IO activity;

in response to detecting, at the source storage system, that the network connection has been restored between the source storage system and the destination storage system:

creating, at the source storage system, a second snapshot comprising a snapshot of each impacted storage resource resident on the source storage array;

performing remote mirroring, from the source storage system to the destination storage system, to store a copy of differences in data of each impacted storage resource resident on the source storage array to the impacted storage resource resident on the destination storage array, wherein the differences in data are identified based on comparing the first and the second snapshot for each impacted storage resource;

transmitting, from the source storage system, a snapshot request for the destination storage system to create a third snapshot comprising a snapshot of each impacted storage resource resident on the destination storage array; and triggering, from the source storage system, the destination storage system to process the third snapshot to identify impacted storage resources for review from the destination storage array based on the differences in data from the source storage system.

20. The non-transitory processor-readable storage medium of claim 19, wherein marking blocks as modified further comprises: issuing a data-less write request, at the source storage system, for a logical block address and a length specified by the pending IO request, wherein the data-less write request is configured to mark the blocks as modified in a mapper layer without writing any content to the impacted storage resource resident on the source storage array.

* * * * *